United States Patent [19]

Ohlig et al.

[11] Patent Number: 4,707,125
[45] Date of Patent: Nov. 17, 1987

[54] PHOTOGRAPHIC REGISTRATION APPARATUS AND METHOD

[75] Inventors: Ernest Ohlig, 2306 Holiday Rd., Newport Beach, Calif. 92660; Conrad B. Sloop, Huntington Beach, Calif.

[73] Assignee: Ernest Ohlig, Newport Beach, Calif.

[21] Appl. No.: 902,148

[22] Filed: Aug. 29, 1986

[51] Int. Cl.⁴ .............................................. G03B 27/20
[52] U.S. Cl. ...................................... 355/94; 355/73; 355/76
[58] Field of Search ...................... 355/87, 91, 94, 73, 355/76

[56] References Cited

U.S. PATENT DOCUMENTS 4,029,404  6/1977  Mizukami et al. ................... 355/91
4,437,759  3/1984  Mizukami et al. ................... 355/91

Primary Examiner—Monroe H. Hayes
Attorney, Agent, or Firm—A. C. Smith

[57] ABSTRACT

Improved method and means are disclosed for holding sheets in registration during photographic exposure on a light table. An impervious blanket is rolled out from and into a housing which travels over the sheets positioned on the light surface to be selectively secured and sealed in place for vacuum gripping of sheets between blanket and light table.

6 Claims, 5 Drawing Figures

PHOTOGRAPHIC REGISTRATION APPARATUS AND METHOD

FIELD AND INVENTION

This invention relates to photographic light boxes for contact printing, and more specifically to rubber blanket apparatus for retaining close registration between master and copy sheets during light exposure.

BACKGROUND OF THE INVENTION

Conventional light boxes for exposing a light-sensitive sheet to a master sheet commonly include an impervious rubber blanket that overlays the stack of sheets to form an air-tight seal against a glass support plate during exposure to light through the glass. A vacuum source evacuates air from between the layers of sheets, glass and blanket with the result that the force of air pressure acting upon the outer surface of the blanket holds the two sheets tightly together in precise registration.

Various mechanisms have been used to support and deploy such rubber blankets during the operating phases when the sheets are being positioned or removed before and after exposure to light. One known scheme supports the blanket above the glass plate on a movable lid that is hinged along the rear edge of the glass plate. Another known scheme allows a rolled blanket to unroll over the glass plate and sheets to be registered that are placed thereon, and then to re-roll the blanket back to a location near the front working edge of the glass plate after the exposure phase. Residual air remaining between the sheets and under the blanket is evacuated through holes in the glass plate to allow the force of air pressure acting upon the outer surface of the unrolled blanket to hold the master and copy sheets in precise registration.

One disadvantage of these known schemes is that the light box becomes directionally limited in that it becomes awkward to service or inspect registration of sheets on the glass plate from any edge. In addition, cleaning of the glass plate is impeded by the structure required to support or house the blanket.

SUMMARY OF THE INVENTION

In accordance with the present invention, an improved method and means for deploying a rubber blanket over photographic sheets positioned upon a glass plate includes a mobile blanket roll that is designed to traverse the glass plate along any selected orthogonal axis as the blanket is deployed over the glass plate. More importantly, the mobile blanket roll promotes unobstructed access to the glass plate for cleaning and inspection of registration of sheets positioned upon the plate. Upon command, the mobile roll may be moved over the area of the glass plate to deploy or retrieve the blanket, and thereafter between operating phases may be positioned at a location remote from the glass plate to facilitate clear unobstructed access to the glass plate.

DESCRIPTION OF THE PREFERRED EMBODIMENT

Figure 1:
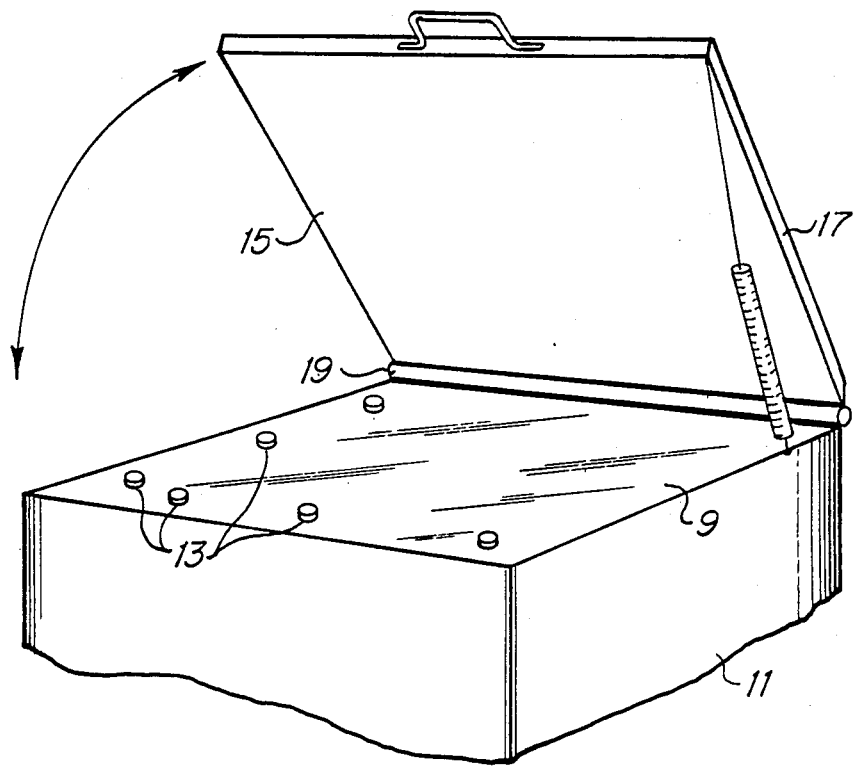
FIG. 1 is a pictorial representation of conventional light box apparatus with a hinged lid-like support for the rubber blanket that overlays the glass plate during light exposure.

Referring now to FIG. 1, there is shown a pictorial representation of a conventional light box commonly used in contact printing processes to expose an actinically-sensitive copy sheet and a master sheet of artwork to a source of radiation (e.g. light). For example, in diazo-type or photographic contact reproduction process, a master sheet and a copy sheet maybe held together in precise registration upon a transparent or translucent glass plate 9 while exposed to a source of light (not shown) within the supporting box 11. To facilitate the precise registration of the sheets during exposure, registration pins 13 may be provided on or about the plate to mate with holes in the registered sheets. It is common practice to overlay the registered sheets with an impervious rubber blanket 15 that forms an air-tight seal around the perimeter of the glass plate. Residual air remaining between the sheets and under the blanket can then be evacuated via apertures through, or around the perimeter of, the glass plate 9 by pumping equipment that is housed within the supporting box 11. The pressure differential thus established across the blanket produces a well distributed force that squeezes the registered sheets together and against the glass plate 9. This assures that the sheets are held flat against the glass plate 9 against relative movement during the exposure to light through the glass plate 9.

After such exposure of the registered sheets, the rubber blanket 15 must be removed to provide access to the sheets. The conventional apparatus of FIG. 1 supports the rubber blanket in a lid-like cover 17 that is hinged 19 to the rear edge of box 11. This arrangement inhibits clear across to the glass plate from all sides for purposes of inspection of sheets on the plate, cleaning of the plate, and the like.

Figure 2:
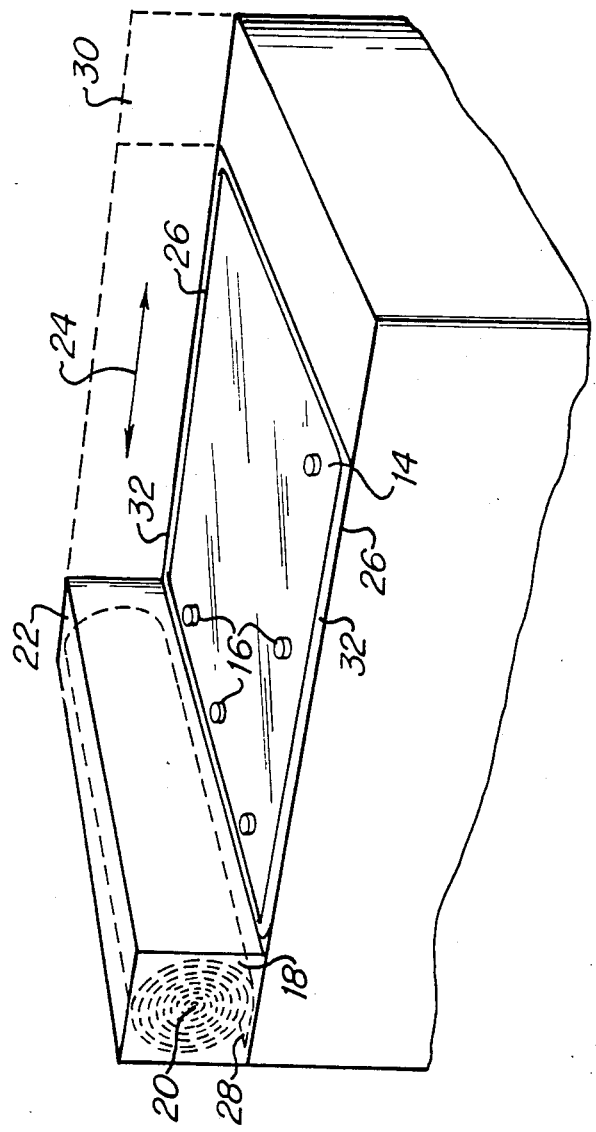
FIG. 2 is a pictorial representation of a conventional mobile light box with the blanket apparatus illustrated by idle position.

In FIG. 2, there is shown a conventional light box 12 that houses the light source, vacuum pump, control circuitry, and the like (not illustrated), and that includes a transparent or translucent glass plate 14 on the top surface through which the desired light exposure is accomplished. Registration pins 16 are provided on the glass plate 14 to facilitate the precise registration of master and copy sheets that are positioned on the plate for exposure.

An impervious blanket 18 is rolled upon a spring-wound roller 20 which, in turn, is mounted at its ends for rotation within housing 22. Housing 22 is disposed to move back and forth 24 from side to side (or from front to rear) along tracks 26 that are positioned near the forward and rearward edges of the plate 14. Drive motors and controls for moving the housing 22 along the tracks 26 are also contained within housing 22 and may be connected to the box 12 through a sufficient length of cable. The outer, lateral edge 28 of the rolled blanket 18 is secured to the upper surface of the box 12 near one side edge to facilitate the unrolling of the blanket 18 off the roller 20 as the housing 22, roller 20, and rolled blanket 18 travel toward the opposite side edge 30. At the position 30 of maximum travel, the blanket 18 is rolled out flat over the glass plate 14 (and over sheets positioned thereon) and forms an air-tight seal about the perimeter thereof. A vaccum pump within the box 12 (not shown) then evacuates the air remaining under the blanket 18 via apertures 32 located around the glass plate within the boundary of the air-tight seal formed by the blanket 18. After the requisite light exposure, the housing 22 and roller 20 travel along tracks 26 back to the initial position illustrated, and in doing so, re-roll the blanket 18 off the surface of the plate 14.

Figure 3A:
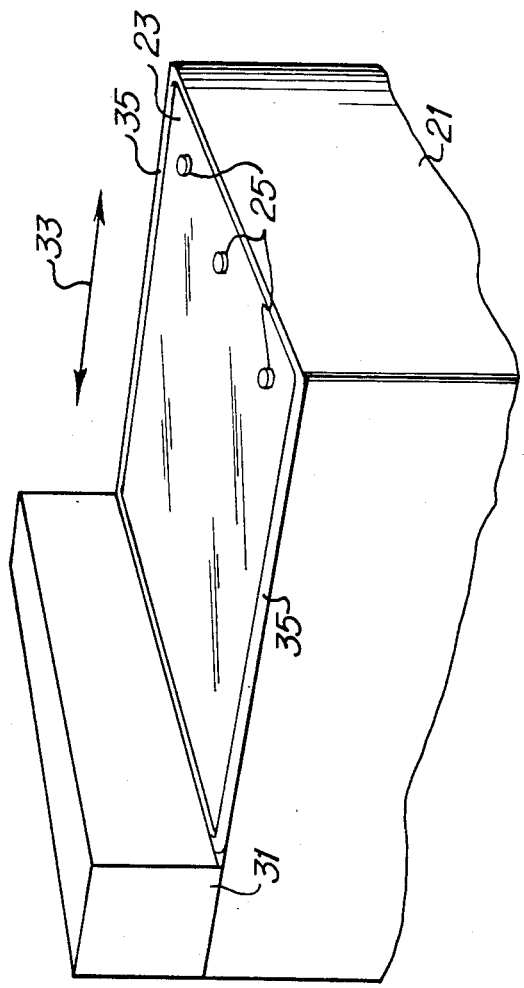
FIGS. 3a and b are pictorial representations of an embodiment of the present invention showing mobile apparatus which deploys the blanket with its front edge lockable in position as the blanket is unrolled.
Figure 3B:
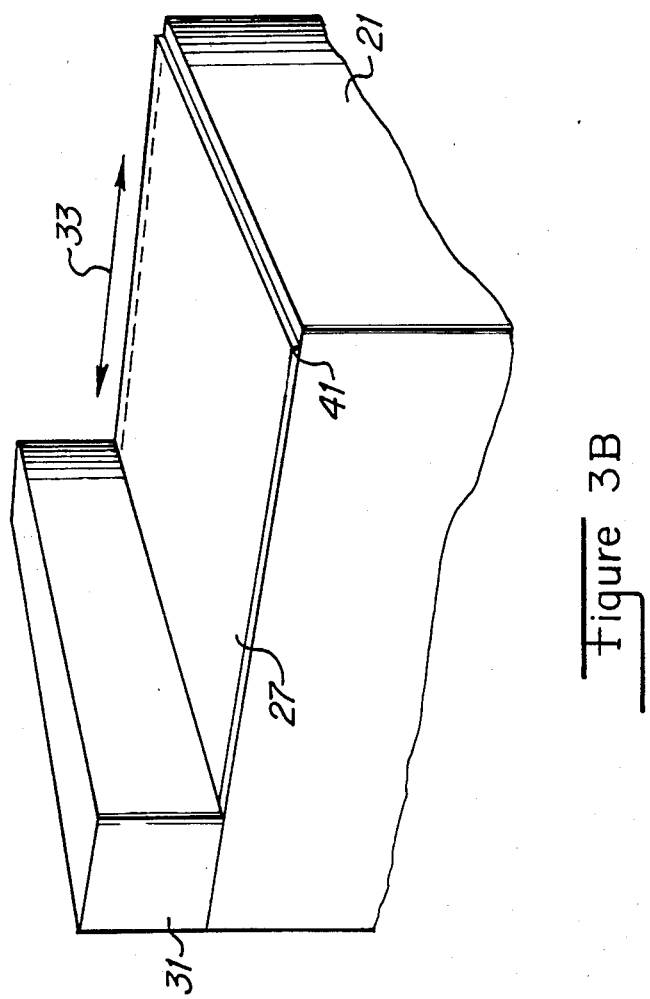

In accordance with the preferred embodiment of the present invention that is illustrated in FIGS. 3a and 3b, there is shown a light box 21 with a transparent or translucent glass plate 23 positioned in the upper surface. Registration pins 25 are positioned near the front edge to facilitate precise, registered positioning of master and copy sheets upon the plate 23. The housing 31 includes the blanket 27 rolled upon a spring-wound roller, but with the outer, lateral edge of the blanket projecting forward and not secured to the upper surface of the box 21. The housing is disposed to travel in the rearward-forward orientation along tracks 35 that are positioned along opposite sides of the plate 23. In this embodiment, the housing 31 with rolled blanket 27 travels 33 to the front edge of the plate 23 and box 21 where the outer, lateral edge of the rolled blanket 27 is latched 41 into position, in the manner later described herein, near the forward edge of the plate 23 to facilitate unrolling of blanket over the plate 23, as shown, as the housing 31 travels rearwardly to the idle position illustrated. The blanket 27 forms an airtight seal around the perimeter of the plate 23 and residual air can be evacuated from under the blanket 27, as previously described. Of course, the drive motors and control circuitry for moving housing 31 may be contained within housing 31 and be connected to the box 21 through a cable of sufficient length.

After pumping air from under the blanket 27 and exposing the registered sheets to light through the plate 23, the housing 31 is controlled to move toward the forward edge from its idle position in order to re-roll blanket 27 onto spring-wound roller 29. At the forward edge, the corresponding edge of the blanket 27 is released, as later described, and the housing 31 with rolled blanket 27 moves back to its idle position beyond the rear edge of plate 23. Of course, it should be understood that the housing 31 may be mounted for travel in the side-to-side orientation, where desired.

In each of the embodiments of the present invention that are illustrated in FIGS. 2 and 3, the tracks 35 may include conventional rack gears or stationary chains for mating with corresponding pinion or sprocket gears attached to drive motors in the housing 31. However, in the embodiment of FIG. 3, the housing 31 with rolled blanket 27 therein may simply be lifted off the box 21 to provide completely unobstructed access to the entire upper surface of the box 21.

Figure 4:
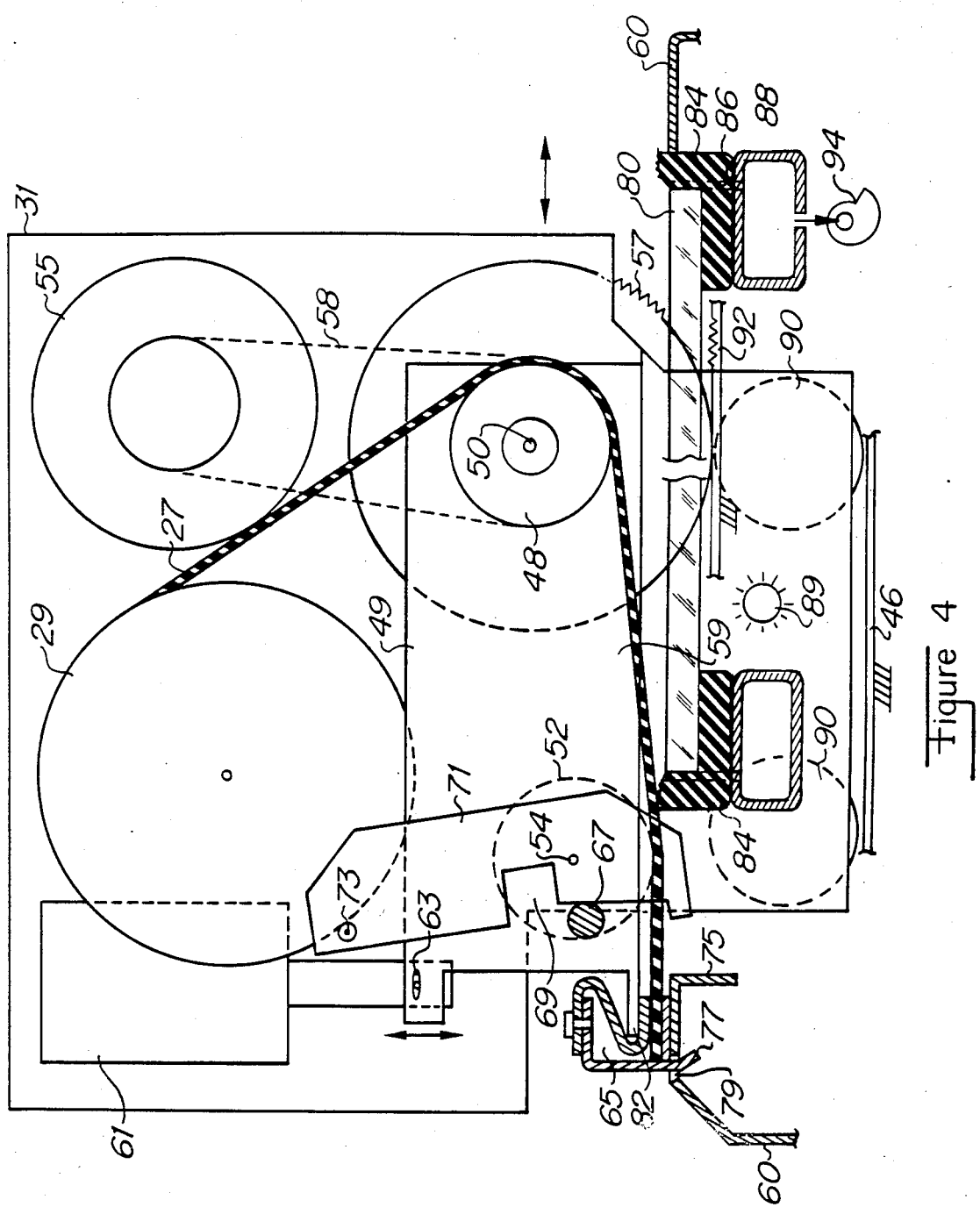
FIG. 4 is a pictorial sectional view of the mobile apparatus of FIG. 3 which illustrates the front edge locking apparatus according to the present invention.

Referring now to FIG. 4, there is shown a pictorial sectional view of the preferred embodiment of the travelling housing 31 with the blanket 27 rolled up on roller 29. The blanket within the housing 31 passes over an idler roller 48 mounted on pivot axis 50, and a pressure roller 52 mounted on lever 49 to assure that the blanket is properly laid down and picked up as the housing 31 travels back and forth between forward and rearward positions. Drive motor 55 is coupled to sprocketed drive wheels 57 via chain 58 for moving the housing 31 back and forth in mating sprocketed tracks 92 while supported by wheels 90 on supporting ways 46. The wheels 90 may be captivated on ways 46 by a removable track (not illustrated) which is positioned on top of these wheels to prevent the housing 31 from tipping and to prevent the sprocket wheels 57 from skipping or jumping out of the mating sprocketed tracks 92.

In accordance with one embodiment of the present invention, the forward edge of the vacuum blanket 27 includes a controllable latch mechanism which engages and disengages from the forward edge of the supporting cabinet 60. Briefly, a latch arm 59 is pivotally mounted on shaft 50 for vertical motion under control of solenoid 61 that is coupled 63 to it for picking up and laying down the fixture 65 that is attached to the forward edge of the blanket 27. A latch pin 67 mounted on the lever 59 is positioned to engage the notch 69 in release lever 71 when lever 59 is in the upper position, and to retain the release lever 71 in rearward position (as shown) when lever 59 is in the lower position (as shown). Release lever 71 pivots on shaft 73 and is mounted to abut the rear edge 75 of the front edge of the supporting cabinet 60. The fixture 65 on the front edge of the blanket 27 includes tabs 77 which drop into the holes 79 in the forward edge of cabinet 60.

In operation, the housing 31 and associated mechanisms described above is driven foward by motor 55 and sprocket 57 toward the forward edge of cabinet 60 from its rest position near the rear edge of the glass exposure plate 80. The fixture 65 attached to the forward edge of the blanket 27 is carried by the protruding edge 82 of lever 59 which is held in the upper position by the latch pin 67 that is engaged with the notch 69 in the release layer 71. As the release lever 71 abuts the rear edge 75 of the forward edge, the release lever 71 pivots rearwardy on shaft 73 to disengage the latch pin 67 from notch 69. This causes the lever 59 to drop to its lower position, and the fixture 65 with tabs 77 carried thereby drop into the holes 79 in the forward edge of cabinet to secure the forward edge of the blanket 27.

The housing 31 now travels rearwardly to unwind the blanket 27 from roller 29 into position over the glass plate 80 and gasket 84. Air remaining between the blanket 27 and plate 80 may be evacuated through apertures 86 located around the perimeter of the plate 80, and through associated vacuum ducts 88 beneath the apertures 86 to vacuum pump 94.

After exposure to light 89 of sheet materials positioned on plate 80 beneath the blanket 27, the housing 31 again is driven forward, this time re-rolling the blanket 27 onto roller 29. The re-rolling blanket 27 passes over the idler roller 48 which has a small radius for flexing the blanket 27 to prevent sheet material from adhering to the blanket 27 and being inadvertently rolled up into the housing 31.

As the lower edge of release lever 71 abuts the cabinet 75, solenoid 61 is controlled to lift the lever 59 with its lower edge 82 engaging fixture 65. The tabs 77 are withdrawn from the holes 79 and the latch pin 67 engages notch 69, and the forward edge of the blanket 27 is held in the upper position clear of the plate 80 and the surrounding gasket 84. The housing 31 can now be driven rearwardly to its rest position near the rear edge of plate 80.

Therefore, the method and means of the present invention conveniently deploy and retract the vacuum blanket over a glass exposure plate to provide unobstructed access to the plate for inspection and cleaning.

I claim:

1. Improved vacuum blanket apparatus comprising:

an exposure plate for passing optical radiation therethrough; support means for said plate;

housing means disposed to move on said support means over said exposure plate in a plane substantially parallel therewith between one location near an edge of the exposure plate and a remote location near another edge of the exposure plate substantially opposite the one location;

a length of flexible, impervious sheet material having length and width dimensions sufficient to substantially cover the exposure plate, said sheet material being supported for transport within the housing means and for selective deployment from and retrieval into the housing means;

latching means coupleable to an edge of the sheet material and to the housing means for selectively fixing said edge of the sheet material near an edge of the exposure plate at one location to deploy the sheet material over the exposure plate during movement of the housing means toward the other location and for releasing said edge at the one location after retrieving the sheet material into the housing means during movement thereof from the other location toward said one location;

motive means coupled to move the housing means bidirectionally across the exposure plate between said locations for sequentially transporting the sheet material and said edge thereof from the remote location to said one location, and for deploying the sheet material over the exposure plate during motion of the housing means in one direction away from said one location, and to retrieve the sheet material into the housing means during motion thereof in the opposite direction toward said one location, and for transporting the sheet material and said edge thereof from the one location to the remote location; and pumping means connected to evacuate air from the region beneath the sheet material.

2. Apparatus as in claim 1 wherein said latching means attaches said edge of the sheet material in fixed relationship to the exposure plate near said one location for deploying the sheet material over the exposure plate from the housing means during movement thereof toward said remote location, and detaches said edge of the sheet material from said fixed relationship for retrieving the sheet material from the exposure plate and into the housing means during movement thereof toward said one location.

3. Improved vacuum blanket apparatus comprising:

an exposure plate for passing optical radiation therethrough; support means for said plate;

housing means disposed to move on said support means over said exposure plate in a plane substantially parallel therewith from one location near an edge of the exposure plate to a remote location near another edge of the exposure plate substantially opposite the one location;

a length of flexible, impervious sheet material having length and width dimensions sufficient to substantially cover the exposure plate, said sheet material being supported for transport within the housing means and for selective deployment from and retrieval into the housing means;

latching means coupleable to an edge of the sheet material and to the housing means for selectively fixing said edge of the sheet material near an edge of the exposure plate at one location to deploy the sheet material over the exposure plate during movement of the housing means toward the other location, and for releasing said edge at the one location after retrieving the sheet material into the housing means during movement thereof from the other location toward said one location;

said latching means including a lever mounted within said housing means for movement between raised and lowered positions in a direction substantially normal to the plane of movement of the housing means on the support means;

said lever being disposed to selectively engage said edge of the sheet material for controllably lowering and raising said edge;

control means mounted within said housing means and connected to raise and lower said lever;

motive means coupled to move the housing means bidirectionally across the exposure plate between said locations for deploying the sheet material over the exposure plate during motion of the housing means in one direction, and to retrieve the sheet material into the housing means during motion thereof in the opposite direction; and pumping means connected to evacuate air from the region beneath the sheet material.

4. Apparatus as in claim 3 comprising:

a pressure roller mounted on said lever for urging the sheet material into surface engagement with the exposure plate as said sheet material is deployed from said housing and said lever is in lowered position.

5. The method of establishing an air-impervious flexible sheet over an operating region within a plane, the method comprising the steps of:

confining the flexible sheet into a deployable and retrievable supply;

mounting the sheet supply for movement over the operating region;

selectively moving the sheet supply and an edge thereof over the operating region;

selectively fixing said edge of the sheet supply against movement within the plane near one boundary of the operating region;

selectively deploying the sheet relative to the fixed edge thereof in response to movement of the sheet supply over the operating region in a direction away from the fixed edge;

selectively retrieving the sheet into the sheet supply relative to the fixed edge in response to movement of the sheet supply over the operating region in a direction toward the fixed edge;

releasing said edge of the sheet supply for movement; and moving the sheet supply and said edge thereof over the operating region in a direction away from said one boundary.

6. The method as in claim 5 wherein the sheet is urged into the surface engagement with the operating region at a location intermediate the one boundary and the sheet supply as the sheet supply is moved toward and from the edge that is fixed at said one boundary.

* * * * *